United States Patent [19]

Gooch

[11] Patent Number: 5,554,035
[45] Date of Patent: Sep. 10, 1996

[54] BIOLUMINESCENT ALGAE IN LIGHT BULB SHAPED VIEWING DEVICE

[76] Inventor: Van D. Gooch, 208 W. Fifth St., Morris, Minn. 56267

[21] Appl. No.: 269,696

[22] Filed: Jul. 1, 1994

[51] Int. Cl.$^6$ ................................................. G09B 23/00
[52] U.S. Cl. ........................................ 434/297; 119/245
[58] Field of Search .................................. 434/297, 296, 434/295, 277, 276, 283, 370, 365, 429, 433; 119/231, 245, 253, 255, 257

[56] References Cited

U.S. PATENT DOCUMENTS

| | | | |
|---|---|---|---|
| 293,639 | 2/1884 | Dignam | 119/253 |
| 3,585,967 | 3/1969 | Kelley | 119/231 |
| 3,886,904 | 6/1975 | King | 119/231 |
| 4,026,243 | 5/1977 | Jessop | 119/245 |
| 5,130,251 | 7/1992 | Stiffey | 435/257 |

FOREIGN PATENT DOCUMENTS

| | | | |
|---|---|---|---|
| 0549388 | 11/1957 | Canada | 119/231 |

OTHER PUBLICATIONS

1995 Annual Reference Catalog for Educators, Students and Inventors, *ES Edmund Scientific*, Barrington, New Jersey 08007.

Product Brochure entitled *Night Life® Science in the DARK!*, Protein Solutions, Inc. 1991, Salt Lake City, UT.

Elijah Swift & Valerie Meunier, *Effects of Light Intensity on Division Rate, Stimulable Bioluminescence and Cell Size of the Oceanic Dinoflagellates Dissodinium lunula, Pyrocystis fusiformis, and P. noctiluca*, 12 J. Phycology 14–22 (1976).

W. H. Biggley et al., *Stimulable and Spontaneous Bioluminescence in the Marine Dinoflagellates, Pyrodinium bahamense, Gonyaulax polydera, and Pyrocystis lunula*, 54 J. Gen. Physiology 96–122 (1972).

Karen A. Steidinger & Daniel G. Baden, *Toxic Marine Dinoflagellates*, in Dinoflagellates 201–61 (David Spector, ed., 1984).

Francois M. M. Morel et al., *Description of the Algal Growth Media: "Aquil" and Fraquil*, Water Quality Laboratory Massachusetts Institute of Technology Technical Note No. 16 (Sep. 1975).

*Primary Examiner*—Edgar S. Burr
*Assistant Examiner*—Anthony H. Nguyen
*Attorney, Agent, or Firm*—Kinney & Lange, P.A.

[57] ABSTRACT

The present invention relates to an apparatus for viewing luminescence of algae. The apparatus comprises bioluminescent, dinoflagellate algae, an aqueous solution in which the bioluminescent algae can live, and a translucent light bulb shaped container for holding the bioluminescent algae in the aqueous solution.

8 Claims, 1 Drawing Sheet

BIOLUMINESCENT ALGAE IN LIGHT BULB SHAPED VIEWING DEVICE

BACKGROUND OF THE INVENTION

The present invention relates generally to an educational and novelty device for viewing bioluminescent algae. In particular, the present invention relates to a light bulb shaped viewing device containing bioluminescent algae.

With the recent resurgence in educating children in science, there is a growing need for devices to exhibit scientific processes and phenomenon in an interesting and educational manner. When demonstrating the scientific process phenomenon, the device should produce consistent results and the device should not pose a health hazard to those who are using the device.

One such scientific phenomenon that is particularly intriguing is luminescence. Prior art devices have attempted to encourage an interest in bioluminescence by placing bioluminescent algae in a clear cylindrical glass or plastic container to enable the bioluminescence to be viewed. The cylindrical container requires minimal care and provides a convenient means by which people can view bioluminescence.

SUMMARY OF THE INVENTION

The present invention relates to an apparatus for viewing luminescence of algae. The apparatus comprises bioluminescent, dinoflagellate algae, an aqueous solution in which the bioluminescent algae can live, and a translucent light bulb shaped container for holding the bioluminescent algae in the aqueous solution.

DETAILED DESCRIPTION OF THE PREFERRED EMBODIMENTS

Figure 1:
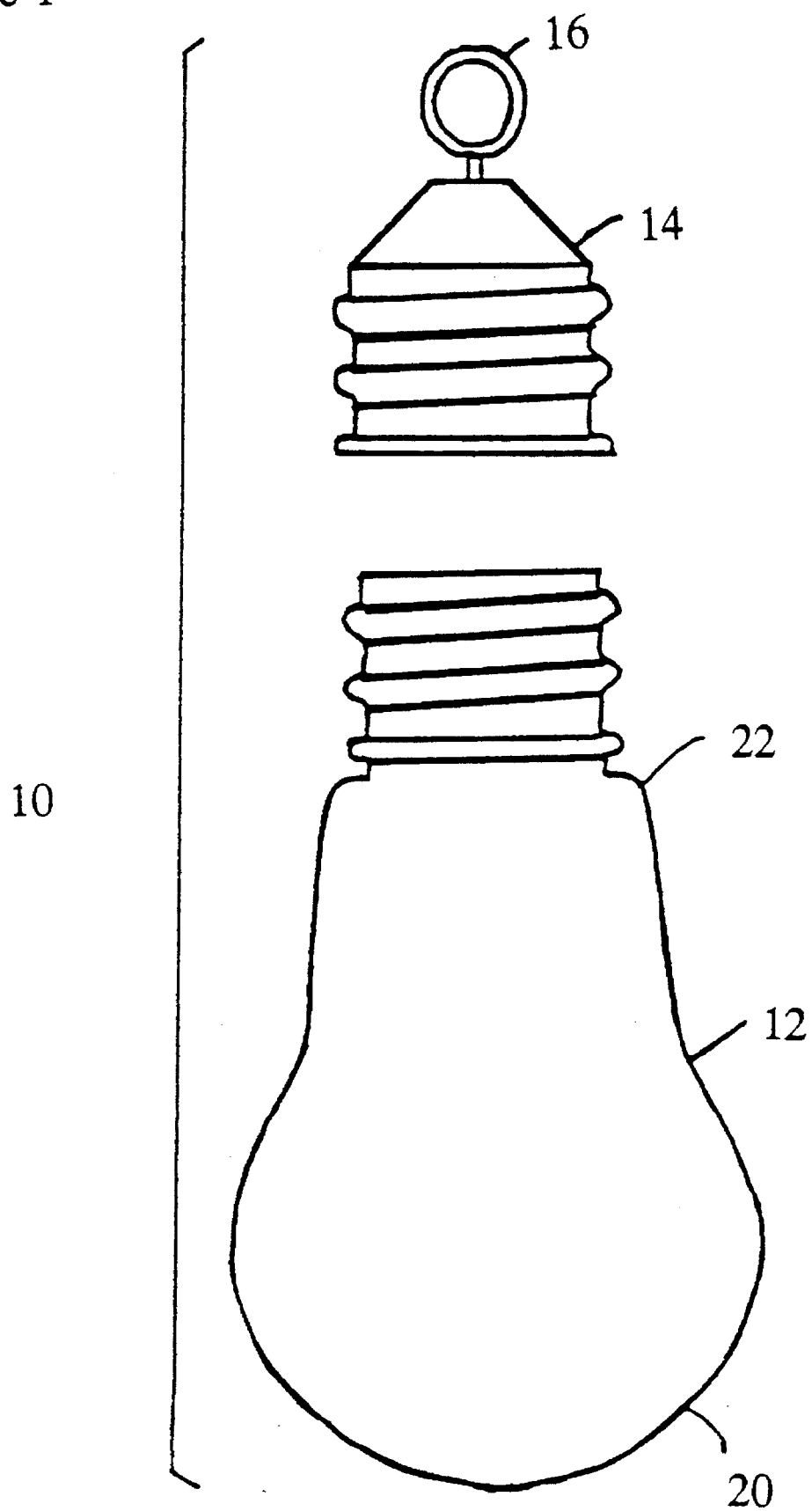
FIG. 1 is a sectional view of a light bulb shaped viewing device for use in the present invention.

A device according to the present invention includes a light bulb shaped container containing bioluminescent, dinoflagellate algae and an aqueous solution. The device provides a simple and educational mechanism for viewing bioluminescence.

By placing bioluminescent algae in a light bulb shaped container, children and adults are given the opportunity to view one of nature's more intriguing processes. Similar to a conventional light bulb, which emits light when turned on, the bioluminescent algae in the light bulb shaped container emit light when shaken. Because of the resemblance of the light bulb shaped bioluminescence viewing device to a light bulb, the device creates a greater interest in luminescence than merely placing the bioluminescent algae in a cylindrical container. As a result of the greater interest in luminescence, the device of the present invention stimulates a greater interest in science.

The phenomenon of bioluminescence is not a phenomenon that people commonly see. Certainly most people are rarely able to produce bioluminescence at will in their own home. Furthermore, there is a fascination of being able to photosynthetically grow marine algae in one's home with minimal care. Hopefully, the ability to grow algae and view the luminescence will encourage people to better appreciate the importance of the wide diversity of organisms on our planet. It is also hoped that the device of the present invention stimulates curiosity and awe and the realization that there must be many more things that we do not yet fully understand.

The bioluminescent algae selected for use in the device of the present invention display a bright luminescence in response to agitation. The bioluminescent algae are also sufficiently hardy so that a significant proportion of the algae remain alive while the device is handled prior to and after sale to a consumer. There are several genera of bioluminescent, photosynthetic, dinoflagellate algae that are suitable for use with the present invention. Preferably, the genera include *Pyrocystis, Dissodinium, Noctiluca, Gonyaulax, Peridinium, Pyrodinium*, and *Ceratium*. The preferred species that exhibits the best balance between luminescence and durability is *Pyrocystis lunula*. This species has also been known as *Dissodinium lunula*.

Because the bioluminescent algae are photosynthetic, they need light to carry out photosynthesis. While the algae can survive for 4–7 days without light, at least 5 hours per day of indirect light from a window or light from a 40 Watt fluorescent bulb is needed for good survival of *Pyrocystis*.

Another important consideration with regard to the algae is the temperature in which they are stored. While *Pyrocystis* can survive at temperatures between 39° F. (4° C.) and 95° F. (35° C.) for short periods of time, the algae optimally grow when maintained at a temperature between 68° F. and 77° F. (20° C. to 25° C.). The time period for *Pyrocystis* to double is approximately 4 days when the temperature is maintained at about 77° F. (25° C.) such as is described by Elijah Swift & Valerie Meunier, *Effects of Light Intensity on Division Rate, Stimulable Biolurninescence and Cell Size of the Oceanic Dinofiagellates Dissodinium Lunula, Pyrocystis Fusiformis, and P. Noctiluca*, 12 J. PHYCOLOGY 14–22 (1976). As a result of these temperature limitations, the algae should not be placed in direct sunlight, which could heat the aqueous solution in the container and cause the algae to die.

The *Pyrocystis* survive well in a closed system of the light bulb shaped container. Presumably, the photosynthetically produced oxygen the algae make during the day is utilized at night by respiration; and the carbon dioxide that is produced during respiration in the dark is utilized by photosynthesis in the light.

The algae placed in the light bulb shaped container only luminesce when the surroundings are dark. Once the surroundings are changed from dark to light, the ability of the algae to luminesce drops significantly. The process of changing the surroundings from dark to light is referred to as photoinhibition. The amount of the photoinhibition depends on the intensity of the light. For example, in the presence of a fluorescent light the ability to luminesce drops to about half in 5 minutes and drops to 10% in about 15 minutes for *Pyrocystis* as described by W. H. Biggley et al., *Stimulable and Spontaneous Bioluminescence in the Marine Dinofiagellates, Pyrodinium bahamense, gonyaulax polydera, and Pyrocystis lunula*, 54 J. GEN. PHYSIOLOGY 96–122 (1972). After being fully photoinhibited, the algae can recover by placing them back into the dark. To achieve 50% recovery takes about 5 minutes and 90% recovery takes 15 minutes.

Another issue that must be addressed when selecting algae for use in the device of the present invention is when the luminescence can be viewed. Some of the dinoflagellates show strong internal daily cycles called circadian rhythms. As a result, the algae may not be capable of luminescence or full luminescence even when placed in the dark if it is during the normal day phase of their cycle. The *Pyrocystis* are preferable for use in the present invention because the *Pyrocystis* only weakly shows circadian rhythms as described by Elijah Swift & Valerie Meunier, *Effects of Light Intensity on Division Rate, Stimulable Bioluminescence and Cell Size of the Oceanic Dinoflagellates Dissodinium Lunula, Pyrocystis Fusiformis, and P. Noctiluca,* 12 J. PHY-COLOOY 14–22 (1976). On the other hand, *Gonyaulax* are less preferably because the *Gonyaulax* exhibits strong circadian rhythms.

For most types of algae, the bioluminescence is only seen upon agitation of the organisms. While *Pyrocystis* are not detrimentally affected by agitation, agitation may be quite harmful to *Gonyaulax*. The algae can be repeatedly agitated to luminescence for about 5 minutes. After this point, the algae must be allowed to regenerate for a day cycle.

When certain genera of alga are placed in the device and viewed in a very dark location, individual cells can usually be seen to spontaneously luminesce and give the appearance of flashing stars in the sky. The light given off by dinoflagellates is a blue color with a peak emission at about 480 nm. This color is consistent with wavelengths that sea water best transmits light.

When selecting the bioluminescent algae for use in the device of the present invention, there is an additional concern that the bioluminescent algae must not be toxic to humans. Toxicity is especially important because the bioluminescence of the algae is particularly intriguing to young children.

Bioluminescent algae toxicity questions typically arise when there are large shell fish kills. The shell fish kills are frequently linked to shell fish consuming large amounts of certain species of bioluminescent dinoflagellates and concentrating certain chemicals from those algae.

The preferred algae, *Pyrocystis*, used in the present invention have never been implicated as one of the dinoflagellates involved in shell fish poisoning as described by Karen A. Steidinger & Daniel G. Baden, *Toxic Marine Dinoflagellates,* in DINOFLAGELLATES 201-61 (David Spector, ed., 1984). If one drank a culture of the dinoflagellates from the device of the present invention, it is highly unlikely that there would be a sufficiently high concentration of toxins to have a detrimental effect. For purposes of incorporating the bioluminescent algae into a novelty item, no species that was known to be involved in shell fish poisoning is used.

The preferred algae used in the present invention require an aqueous sea water solution to live and reproduce. The sea water solution can either be artificially made or naturally obtained with supplements. One such artificial sea water composition is described in Francois M. M. Morel et al., *Description of the Algal Growth Media: "Aquil" and "Fraquil"*, Water Quality Laboratory Massachusetts Institute of Technology Technical Note No. 16 (Sept. 1975).

The artificial sea water is preferably a combination of Aquil sea water and f/2, which are described in Francois M. M. Morel et al., *Description of the Algal Growth Media: "Aquil" and "Fraquil"*, Water Quality Laboratory Massachusetts Institute of Technology Technical Note No. 16 (September 1975) and R. Guillard & J. Ryther, 1962 *Studies of Marine Planktonic Diatoms.* I. Cyclotella nana Hustedt, and Detonula confervacae (Cleve) Gran, 8 CAN. J. MICROBIOLOGY 229–239 (1962). Preferably, the artificial sea water solution has the following composition:

419.0 mM NaCl;

54.6 mM $MgCl_2.6H_2O$;

28.8 mM $Na_2SO_4$;

10.5 mM $CaCl_2.2H_2O$;

9.39 mM KCl;

2.38 mM $NaHCO_3$;

0.941 mM $NaNO_3$;

0.840 mM KBr;

0.485 mM $H_3BO_3$;

71.4 µM NaF;

63.8 µM $SrCl_2.6H_2O$;

50.7 µM $NaH_2PO_4.H_2O$;

18.4 µM $Na_2EDTA$;

12.5 µM $Na_2SiO_3.9H_2O$;

12.1 µM $FeCl_3.6H_2O$;

12.8 nM $ZnSO_4.7H_2O$;

73.8 nM $MnCl_2.4H_2O$;

48.8 nM $CoCl_2.6H_2O$;

40.0 nM $CuSO_4.5H_2O$;

26.0 nM $NaMoO_4.2H_2O$;

0.214 nM $(NH_4)_6Mo_7O_{24}.4H_2O$;

0.593 µM thiamine;

4.09 nM biotin;

0.81 nM Vitamin $B_{12}$; and

2% by weight soil extract.

The artificial sea water solution is prepared in stages. First, groups of components are prepared and then the groups of components are mixed together to form the artificial sea water solution. The groups of components are a salt mixture, a stock silicate solution, a stock vitamin mixture, a stock metals mixture, and a soil extract. Prior to preparing the artificial sea water solution components, all glassware is washed with 2M HCl solution.

The salt mixture is prepared by dry blending the following chemicals:

245.3 g NaCl 40.9 g $Na_2SO_4$ 15.4 g $CaCl_2.2H_2O$ 7.0 g KCl 2.0 g $NaHCO_3$ 0.8 g $NaNO_3$ 1.0 g KBr 0.3 g $H_3BO_3$ 0.03 g NaF 0.17 g $SrCl_2.6H_2O$ 0.07 g $NaH_2PO_4.H_2O$

The stock silicate solution is prepared by dissolving 3.55 grams of $Na_2SiO_3.9H_2O$ in deionized water. The solution is then diluted to 1.0 liter with deionized water.

The stock vitamin mixture is prepared by mixing:

0.1 ml vitamin $B_{12}$ (11 mg/10 ml)

1.0 ml biotin (10 mg/100 ml)

20.0 mg thiamine-HCl

After the vitamins are mixed, the vitamin mixture is diluted to 100 milliliters with deionized water.

Prior to preparing the stock metals mixture, a Mo, Co solution is prepared by dissolving 0.265 grams of $(NH_4)_6Mo_7O_{24}.4H_2O$ and 0.595 grams of $CoCl_2.6H_2O$ in deionized water. The Mo, Co solution is then diluted to 1.0 liter with deionized water.

The stock metals mixture is prepared by dissolving 6.20 grams of $Na_2EDTA$ in approximately 800 milliliters of deionized water. Once the $Na_2EDTA$ is completely dissolved, 3.27 grams of $FeCl_3.6H_2O$ are added to the mixture and mixed until completely dissolved. The following metals are then blended into the mixture:

- 40.0 ml $CuSO_4.5H_2O$ (0.249 g/l)
- 14.6 mg $MnCl_2.4H_2O$
- 3.68 mg $ZnSO_4.7H_2O$
- 11.0 mg $CoCl_2.6H_2O$
- 6.3 mg $NaMoO_4.2H_2O$
- 1.0 ml Mo, Co solution After all of the metals are dissolved, the stock metal mixture is diluted to 1.0 liter by adding deionized water.

The soil extract is prepared by placing 1 liter of deionized water and 200 grams of soil in a 3 liter Erlenmeyer flask. The soil-water mixture is boiled for two hours. While the soil-water mixture is being boiled deionized water is added to maintain the water volume at approximately 1 liter. Once boiling is completed, the liquid is decanted and then centrifuged. After centrifuging, a supernatant portion of the liquid is decanted and autoclaved. The supernatant portion is the soil extract. The soil extract is refrigerated until it is used.

The components are now ready for blending together to form the preferred artificial sea water solution. Between the addition of each of the components, the mixture is thoroughly blended so that the components are homogeneously distributed. Approximately 8 liters of deionized water are placed in a 10 liter bottle. First, 10 milliliters of the stock metal mixture are added to the bottle. Second, 10 milliliters of the stock silicate solution are added to the bottle. Third, 10 milliliters of the stock vitamin mixture are added to the bottle. Fourth, the entire amount of the salt mixture is added to the bottle. Fifth, 111 grams of $MgCl_2.H_2O$ are added to the bottle. Sixth, 200 milliliters of soil extract are added to the bottle. Seventh, deionized water is added to the bottle to dilute the mixture to 10 liters. Finally, the mixture is autoclaved. The autoclaved mixture is the completed artificial sea water solution, which can be used immediately or stored for a short period of time.

The algae can also be maintained in a solution of real sea water and f/2 supplements. Such a solution is described in R. Guillard & J. Ryther, 1962 *Studies of Marine Planktonic Diatoms.* L Cyclotella nana Hustedt, and Detonula confervacae (Cleve) Gran, 8 CAN. J. MICROBIOLOGY 229–239 (1962).

The light bulb shaped container was known prior to its incorporation into the device of the present invention. The light bulb shaped container is believed to have been used for packaging of small food articles.

At least a portion of the light bulb shaped container 10 is translucent or transparent so that light can enter the container 10. The light is required to enable the algae to conduct photosynthesis. The ability of the container 10 to transmit light is also important so that the luminescence can be viewed without opening the container 10. The container 10 is preferably constructed in two components: a bulb 12 and a cap 14.

Bulb 12 includes a bulbous portion 20 and a neck portion 22 that extends from the bulbous portion 20. The bulbous portion 20 has a substantially spherical shape. The neck portion 22 has a diameter that is smaller than a diameter of the bulbous portion 20. When viewed together, the bulbous portion 20 and the neck portion 22 of the bulb 12 resemble the shape of a conventional incandescent light bulb.

The bulb 12 and the cap 14 are preferably constructed from a plastic material that is compatible with the survival of the algae. Preferably, the plastic material is high-density polyethylene, low-density polyethylene, polypropylene or polyethylene. The bulb 12 can also be constructed from a glass material.

The bulb 12 is preferably transparent or translucent. However, pigment can be added to the material that is used to construct the cap 14 to give the cap 14 a more realistic appearance that is similar to the metallic base of an actual light bulb.

The algae and the aqueous solution are then placed in the bulb 12. The algae and the aqueous solution preferably fill approximately ⅔× of the bulb 12. After the bioluminescent algae and the aqueous solution are placed in the bulb 12, the cap 14 is screwed on the bulb 12. The cap 14 tightly engages the bulb 12 so as to prevent leakage of the algae and the aqueous solution from the container 10.

The cap 14 is retained in relation to the bulb 12 by a fastening mechanism that prevents inadvertent access to the contents inside the bulb 12. The cap 14 is preferably ultrasonically welded to the bulb 12 to prevent inadvertent removal of the cap 14 from the bulb 12.

The cap 14 can also be retained in relation to the bulb 12 using a child-proof mechanism (not shown), which is commonly used on medicine bottles. Many such child-proof mechanisms are known in the art. The child-proof mechanism would allow the cap 14 to be removed from the bulb 12 so that fresh sea water could be added to the container 10. Addition of fresh sea water would enable the algae to be maintained indefinitely.

The cap 14 preferably includes an integrally formed eyelet 16. The eyelet 16 enables the container 10 to be hung in a window or near a light. Alternatively, the container 10 can be laid by the window or the light.

Although the present invention has been described with reference to preferred embodiments, workers skilled in the art will recognize that changes may be made in form and detail without departing from the spirit and scope of the invention.

What is claimed is:

1. An apparatus for viewing luminesence of algae, the apparatus comprising: bioluminescent, dinoflagellate algae;

an aqueous solution in which the bioluminescent algae can live; and a light bulb shaped container having a bulbous portion and a neck portion extending from the bulbous portion, the light bulb shaped container holding the bioluminescent algae and the aqueous solution, at least a portion of the light bulb shaped container being translucent, where in the aqueous solution has the following composition:

- 419.0 mM NaCl;
- 54.6 mM $MgCl_2.6H_2O$;
- 28.8 mM $Na_2SO_4$;
- 10.5 mM $CaCl_2.2H_2O$;
- 9.39 mM KCl;
- 2.38 mM $NaHCO_3$;
- 0.941 mM $NaNO_3$;
- 0.840 mM KBr;
- 0.485 mM $H_3BO_3$;
- 71.4 µM NaF;
- 63.8 µM $SrCl_2.6H_2O$;
- 50.7 µM $NaH_2PO_4.H_2O$;
- 18.4 µM $Na_2EDTA$;
- 12.5 µM $Na_2SiO_3.9H_2O$;
- 12.1 µM $FeCl_3.6H_2O$;
- 12.8 nM $ZnSO_4.7H_2O$;

73.8 nM $MnCl_2.4H_2O$;

48.8 nM $COCl_2.6H_2O$;

40.0 nM $CuSO_4.5H_2O$;

26.0 nM $NaMoO_4.2H_2O$;

0.214 nM $(NH_4)_6Mo_7O_{24}.4H_2O$;

0.593 µM thiamine;

4.09 nM biotin;

0.81 nM Vitamin $B_{12}$; and

2% by weight soil extract.

2. The apparatus of claim 1 wherein the bioluminescent, dinoflagellate algae are selected from the group consisting of the following genera: *Pyrocystis, Dissodinium, Noctiluca, Gonyaulax, Peridinium, Pyrodinium,* and *Ceratium.*

3. The apparatus of claim 1 wherein the light bulb shaped container is constructed from a cap portion and a bulb portion.

4. The apparatus of claim 3 wherein the bulb portion is constructed from a translucent plastic material.

5. The apparatus of claim 3 wherein the bulb portion is constructed from a transparent plastic material.

6. The apparatus of claim 3 wherein the bulb portion is constructed from a glass material.

7. The apparatus of claim 3 wherein the cap portion and the bulb portion are threadably retained in relation to each other.

8. The apparatus of claim 3 wherein the cap portion is ultrasonically welded to the bulb portion.

* * * * *

UNITED STATES PATENT AND TRADEMARK OFFICE
CERTIFICATE OF CORRECTION

PATENT NO. : 5,554,035
DATED : SEPTEMBER 10, 1996
INVENTOR(S) : DR. VAN D. GOOCH

It is certified that error appears in the above-indentified patent and that said Letters Patent is hereby corrected as shown below:

Col. 2, line 32, delete "Biolurninescence", insert --Bioluminescence--

Col. 2, line 33, delete "Dinofiagellates", insert --Dinoflagellates--

Col. 2, lines 54 and 55, delete "Dinofiagellates", insert --Dinoflagellates--

Signed and Sealed this

Thirty-first Day of December, 1996

Attest:

BRUCE LEHMAN

Attesting Officer      Commissioner of Patents and Trademarks